US012368211B2

(12) United States Patent
Kim

(10) Patent No.: US 12,368,211 B2
(45) Date of Patent: Jul. 22, 2025

(54) BATTERY PACK

(71) Applicant: SK ON CO., LTD., Seoul (KR)

(72) Inventor: Seok Min Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/539,080

(22) Filed: Dec. 13, 2023

(65) Prior Publication Data
US 2024/0204348 A1    Jun. 20, 2024

(30) Foreign Application Priority Data
Dec. 14, 2022 (KR) .................. 10-2022-0174928

(51) Int. Cl.
*H01M 10/613*  (2014.01)
*H01M 10/658*  (2014.01)
*H01M 50/211*  (2021.01)
*H01M 50/383*  (2021.01)

(52) U.S. Cl.
CPC ....... *H01M 50/383* (2021.01); *H01M 10/613* (2015.04); *H01M 10/658* (2015.04); *H01M 50/211* (2021.01)

(58) Field of Classification Search
CPC .................. H01M 10/658; H01M 10/613
See application file for complete search history.

(56) References Cited

U.S. PATENT DOCUMENTS

| 2018/0062226 A1 | 3/2018 | Raiser et al. |
| 2020/0185672 A1* | 6/2020 | Seo .............. H01M 10/6568 |
| 2020/0274120 A1 | 8/2020 | Chen et al. |
| 2020/0358058 A1 | 11/2020 | Murayama et al. |
| 2022/0140428 A1* | 5/2022 | Chi ............... H01M 50/211 |
| | | 429/99 |

FOREIGN PATENT DOCUMENTS

| CN | 115377591 A | * | 11/2022 |
| DE | 102021110496 A1 | | 3/2022 |
| EP | 3316391 B1 | | 5/2021 |
| KR | 10-2021-0108451 A | | 9/2021 |
| KR | 10-2021-0132817 A | | 11/2021 |
| WO | 2022/186518 A1 | | 9/2022 |

* cited by examiner

*Primary Examiner* — Jonathan G Jelsma
(74) *Attorney, Agent, or Firm* — Perkins Coie LLP

(57) ABSTRACT

A battery pack is disclosed. In some embodiments of the disclosed technology, a battery pack including: one or more battery modules, each battery module including: one or more battery cells; and a module case accommodating the one or more battery cells therein and a base panel forming a lower surface of the module case; and an accommodating panel forming a bottom surface of a module accommodating space for accommodating the one or more battery modules, wherein the accommodating panel includes: a first bottom surface positioned to face each of the base panels; and a second bottom surface including a heat resistance portion which is connected to at least a part of the first bottom surface and configured to reduce conduction of heat generated from any one of the battery modules to another adjacent battery module through the first bottom surface.

18 Claims, 9 Drawing Sheets

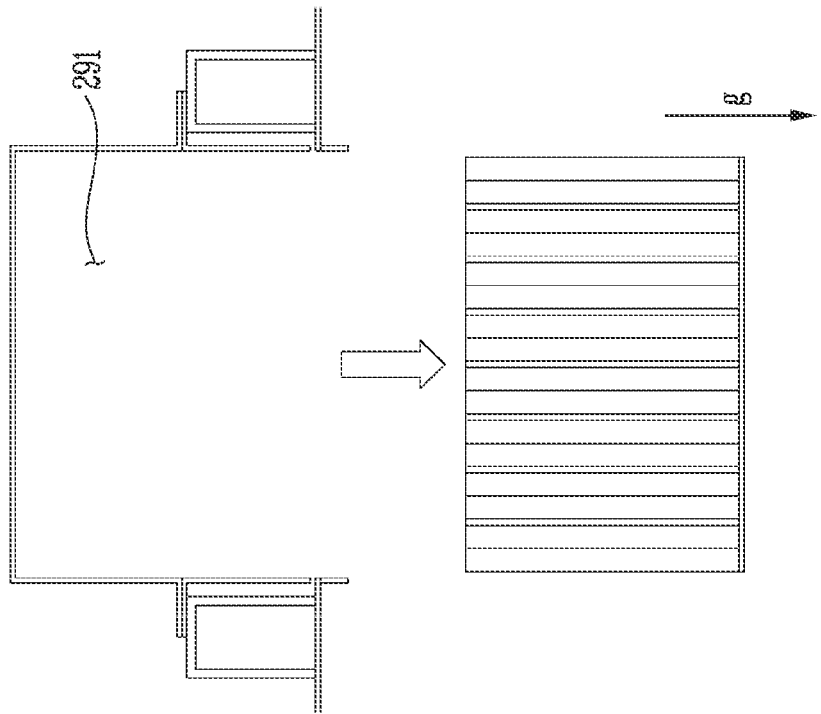
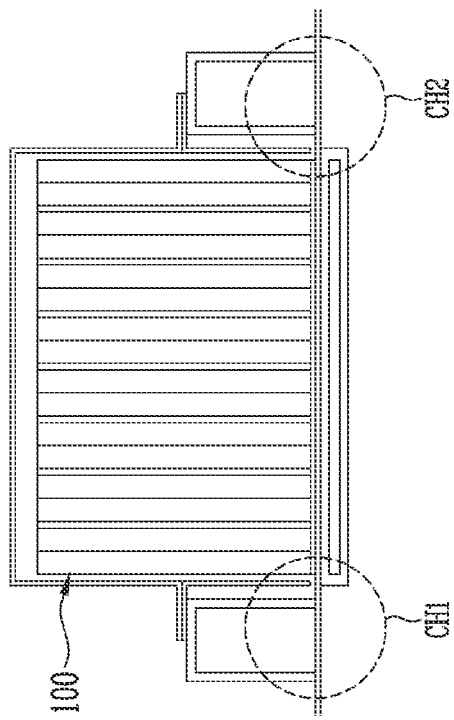

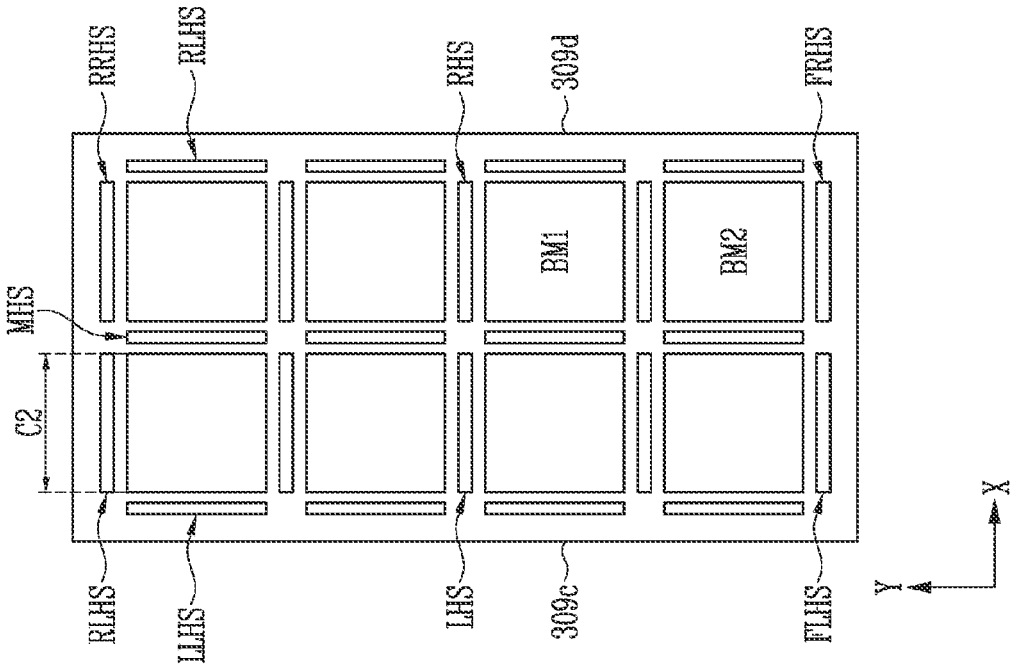
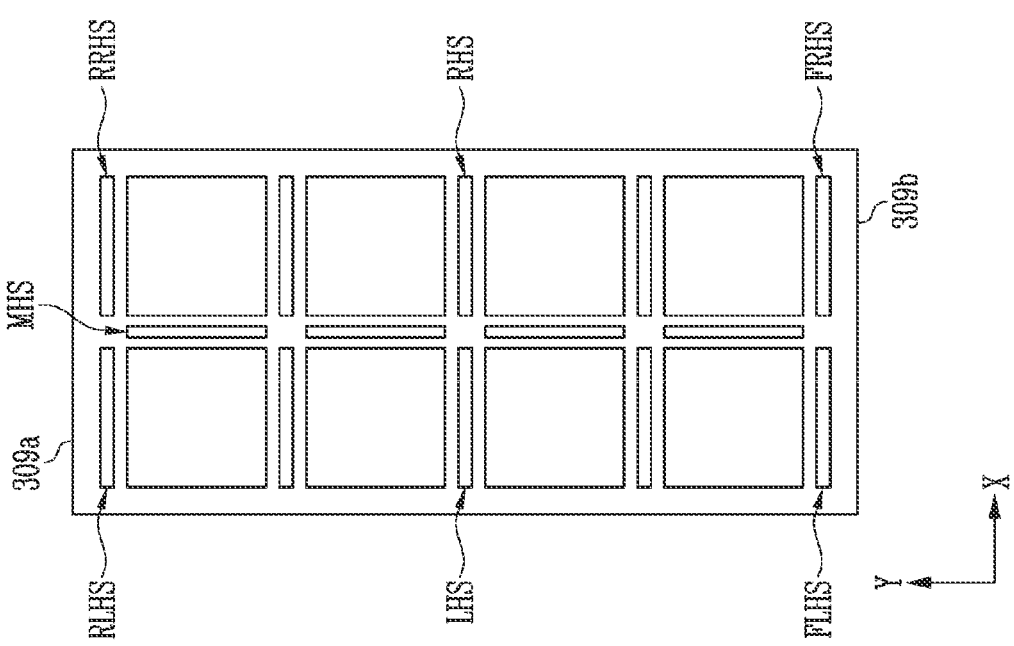

BATTERY PACK

CROSS-REFERENCE TO RELATED PATENT APPLICATION

This patent document claims the priority and benefits of Korean patent application number 10-2022-0174928 filed on Dec. 14, 2022, the entire disclosure of which is incorporated herein by reference.

TECHNICAL FIELD

1. Field

The technology and implementations disclosed in this patent document generally relates to a battery pack.

2. Description of the Related Art

Recently, due to fires or explosions that occur during the use of lithium secondary batteries, concerns are growing about the safety of battery use. For this reason, one of the major development tasks of lithium secondary batteries is to eliminate unsafe conditions such as fire and explosion caused by thermal runaway of battery cells.

SUMMARY

The disclosed technology can be implemented in some embodiments to prevent or mitigate thermal propagation in the specific battery module to other battery modules when a fire occurs in a specific battery module.

The disclosed technology can be implemented in some embodiments to provide a battery pack with different thermal conductivity or thermal resistance values depending on the position.

The disclosed technology can be implemented in some embodiments to separate or remove only a specific battery module that has reached a certain temperature from the battery pack. The disclosed technology can be implemented in some embodiments to separate or remove a cell assembly provided inside the specific battery module.

The disclosed technology can be implemented in some embodiments to independently cool a plurality of battery modules.

The disclosed technology can be implemented in some embodiments to provide a battery pack structure applicable to a Cell To Pack (CTP) structure or a Cell To Chassis (CTC) structure.

The disclosed technology can be implemented in some embodiments to provide a structure of battery pack that exhibits an effect of mitigating or blocking thermal propagation (TP) between battery modules inside a battery pack. In particular, the disclosed technology discloses a structure changing a heat transfer path or increasing thermal resistance to prevent thermal propagation.

In some embodiments, a battery pack may include: one or more battery cells; one or more battery modules including a module case accommodating the one or more battery cells therein and a base panel forming a lower surface of the module case; and an accommodating panel forming a bottom surface of a module accommodating space for accommodating the one or more battery modules, wherein the accommodating panel includes: a first bottom surface positioned to face each of the base panels; and a second bottom surface including a heat resistance portion which is connected to at least a part of the first bottom surface and which prevents or mitigates conduction of heat generated from any one of the battery modules to another adjacent battery module through the first bottom surface.

In some implementations, the heat resistance portion may have a hole shape penetrating the second bottom surface.

In some implementations, the thickness of at least a part of the heat resistance portion may be smaller than the thickness of the first bottom surface.

In some implementations, the thermal conductivity of the heat resistance portion may be smaller than the thermal conductivity of the first bottom surface.

In some implementations, the thermal resistance portion may extend in a direction in parallel with any one of edges of the base panel.

In some implementations, when the temperature of the base panel reaches a temperature that is equal to or higher than a preset allowable temperature which is higher than room temperature, the tensile strength of the base panel may be lower than the tensile strength of the base panel at the room temperature.

In some implementations, when the temperature of the first bottom surface reaches a temperature that is equal to or higher than a preset deformation temperature which is higher than room temperature, the tensile strength of the first bottom surface may be lower than the tensile strength of the first bottom surface at the room temperature.

In some implementations, at the deformation temperature or higher, the shape of the accommodating panel may be deformed by the weight of the at least one battery module.

In some implementations, the battery pack may further include a comparting portion coupled to the accommodating panel to separate each of the one or more battery modules.

In some implementations, the heat resistance portion may be disposed below the comparting portion along an extending direction of the comparting portion.

In some implementations, at least a part of the heat resistance portion may be shielded by the comparting portion when the heat resistance portion is viewed from above the accommodating panel.

In some implementations, the module case may include a first flange portion and a second flange portion extending in a direction away from both sides of the module case, wherein, when the one or more battery modules are accommodated in the module accommodating space, the first flange portion and the second flange portion may be positioned above the comparting portion.

In some implementations, the module case may include: a first body including a first body first panel and a first body second panel extending in a direction away from the accommodating panel from the base panel and a pair of edges facing each other among edges of the base panel, respectively; and a second body including a second body first panel and a second body second panel extending toward the first body from a connecting panel facing the base panel and a pair of edges provided at positions corresponding to the first body first panel and the first body second panel among edges of the connecting panel, respectively, and being coupled with the first body.

In some implementations, the module case may further include: a first body first extension portion and a first body second extension portion bent from the first body first panel and the first body second panel, respectively, and extending in a direction away from the first body; a second body first extension portion and a second body second extension portion bent from the second body first panel and the second body second panel, respectively, and extending in a direction away from the first body; a first flange portion formed to be positioned so that the first body first extension portion and the second body first extension portion face each other when the first body and the second body are coupled; and a second flange portion formed to be positioned so that the first body second extension portion and the second body second extension portion face each other when the first body and the second body are coupled.

In some implementations, when the one or more battery modules are accommodated in the module accommodating space, the first flange portion and the second flange portion may be positioned above the comparting portion.

In some implementations, when the temperature of the base panel reaches a preset allowable temperature higher than room temperature, the tensile strength of the base panel may be lower than the tensile strength of the base panel at room temperature.

In some implementations, when the temperature of the first bottom surface reaches a preset deformation temperature higher than room temperature, the tensile strength of the first bottom surface may be lower than the tensile strength of the first bottom surface at room temperature.

In some implementations, each base panel of the one or more battery modules may be positioned separately from each other on the accommodating panel, and at least a part of the second bottom surface may be positioned between each base panel.

In some implementations, the battery pack may further include a plurality of cooling units each positioned below the one or more battery modules.

The second bottom surface may also be positioned between edges of each of the base panel and of the accommodating panel.

The disclosed technology can be implemented in some embodiments to prevent or mitigate thermal propagation in the specific battery module to other battery modules when a fire occurs in a specific battery module.

In some embodiments of the disclosed technology, thermal conductivity or thermal resistance values may be different depending on the position of the bottom surface of the battery pack.

The disclosed technology can be implemented in some embodiments to separate or remove only a specific battery module that has reached a certain temperature from the battery pack, or separate or remove a cell assembly provided inside the specific battery module.

The disclosed technology can be implemented in some embodiments to independently cool a plurality of battery modules.

The disclosed technology can be implemented in some embodiments to provide a structure of battery pack that is applicable to a Cell To Pack (CTP) structure or a Cell To Chassis (CTC) structure.

BRIEF DESCRIPTION OF THE DRAWINGS

FIG. 7A shows a cross-section of the battery module and a compartment adjacent to the battery module. FIG. 7B shows an example of the battery module being separated.

FIG. 9A shows another example of an accommodating panel. FIG. 9B shows another example of an accommodating panel.

DETAILED DESCRIPTION

Hereinafter, some embodiments of the disclosed technology will be described in detail with reference to the attached drawings. The configuration or control method of the device described below will be discussed by way of example only.

Specific terms used in this specification are merely for convenience of explanation and are not used to limit the illustrated embodiments.

In some implementations, a battery pack may include a housing, and a module tray on a battery module is disposed and spaced apart from the housing, and a cooling unit for cooling the battery module by introducing a coolant between the housing and the module tray to remove heat generated by the battery module. In the event of occurrence of a fire in a specific battery module, it may be difficult to cool only the remaining battery modules excluding the specific battery module on fire, and it may be difficult to prevent or mitigate thermal propagation from the fire in the specific battery module to other adjacent battery modules.

To address these issues, the disclosed technology can be implemented in some embodiments to provide a battery pack for preventing or mitigating thermal propagation in a specific battery module to adjacent battery modules.

In some embodiments of the disclosed technology, the term "battery cell" may be used to indicate a basic unit of a lithium secondary battery, specifically a lithium-ion battery, which can be used by charging and discharging electrical energy. The main components of the battery cell are a cathode, an anode, a separator, and an electrolyte, and these main components are placed in a case (or pouch). The battery cell may further include tabs each connected to the cathode and the anode for electrical connection to the outside and protruding out of the pouch.

In some embodiments of the disclosed technology, the term "battery module" may be used to indicate a battery assembly in which one or more battery cells are grouped in one or more numbers and placed in a case to protect them from external shock, heat, vibration, or the like.

In some embodiments of the disclosed technology, the term "battery pack" may be used to indicate a set in which a preset number of the battery modules are gathered together to achieve a desired voltage or power.

Figure 1A:
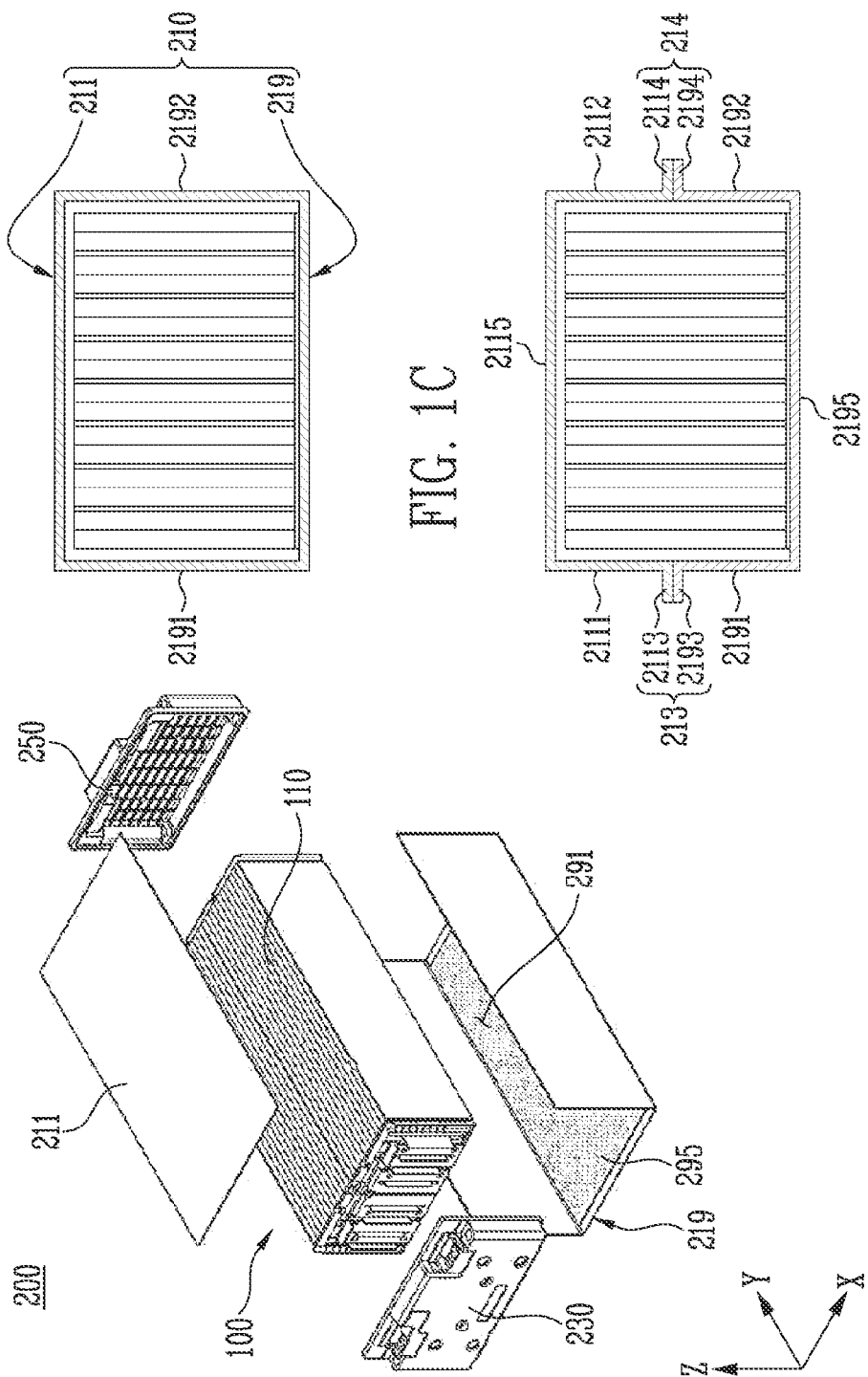
FIG. 1A is an exploded diagram of a battery module.

FIG. 1A is an exploded diagram of a battery module. Referring to FIG. 1A, a battery module 200 may include one or more battery cells 110 and a bus bar assembly (not shown) electrically connected to the battery cells 110. In some implementations, after the one or more battery cells 110 are stacked, they may be electrically integrated and connected by the bus bar assembly. This is referred to as a cell assembly 100. The bus bar assembly may also perform a function of electrically connecting the cell assembly to an outside of the battery module.

The battery module 200 may further include a module case 210 (see FIG. 1B) forming a cell accommodation space 291 for accommodating the cell assembly 100. The module case 210 may be provided to protect the cell assembly 100 from the outside.

The module case 210 may include: a first body 219 supporting one surface of the cell assembly 100; and a second body 211 coupled with the first body 219. The first body 219 may have a channel shape or U shape with an open top and with both sides open along the Y-direction. The second body 211 may be coupled with the first body 219 to close an open top of the first body 219.

When the first body 219 and the second body 211 are coupled, the module case 210 may have a rectangular duct shape with both sides open along the Y-direction.

The module case 210 may further include a first cover 230 and a second cover 250 coupled with the both sides. The first cover 230 and the second cover 250 may include an insulating material.

Referring to FIG. 1A, the length of the battery cell 110 along a first direction, which is one of directions perpendicular to a height direction, may be longer than the length of the height direction (or a second direction) to improve safety of vehicles by lowering the center of gravity of a battery pack in vehicles that use the battery cell 110. Such a rectangular-shaped battery cell may be referred to as a long cell.

A battery module 200 may further include a heat dissipating portion 295 disposed between the first body 219 and the cell assembly 100 in contact with the cell assembly 100. The heat dissipating portion 295 may quickly discharge heat generated from the cell assembly 100 to the outside. For example, the heat dissipating portion 295 may be provided in the form of a heat dissipating pad or a thermal adhesive.

In some implementations, a battery cell 110 may be a pouch-type secondary battery (or battery cell), a prismatic secondary battery, or a cylindrical secondary battery. Although the drawings show a pouch-type battery cell as an example, the disclosed technology is not limited thereto.

Figure 1B:
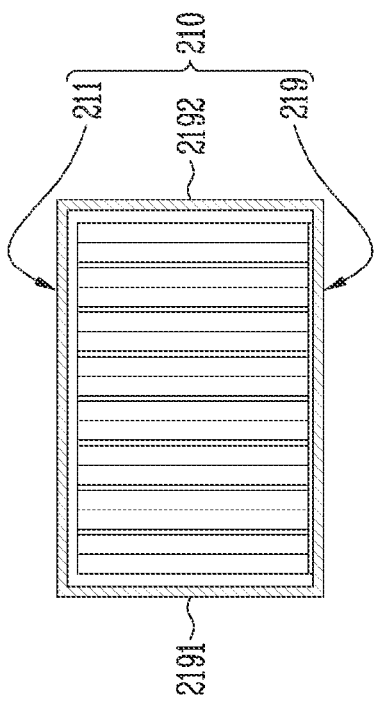
FIG. 1B shows a cross-section cut along the X-direction of an example of a battery module.

FIG. 1B shows a cross-section cut along the X-direction of an example of the battery module 200. Referring to FIG. 1B, the battery module 200 may include a module case 210 to form a cell accommodating space 291 for accommodating the cell assembly 100. The module case 210 may include a first body 219 and a second body 211 coupled with the first body 219.

The first body 219 includes a side that is open and may accommodate the cell assembly 100 through the open side. To this end, the first body 219 may include: a base panel 2195 supporting the cell assembly 100; and a first body first panel 2191 and a first body second panel 2192 which are bent and extend from both ends of the base panel 2195 in the X-direction toward the open side. Accordingly, the first body 219 may be a U-shape or a channel shape with both sides open along the Y-direction.

The second body 211 (or module cover) may be coupled with the first body 219 to close the open surface of the first body 219.

Figure 1C:
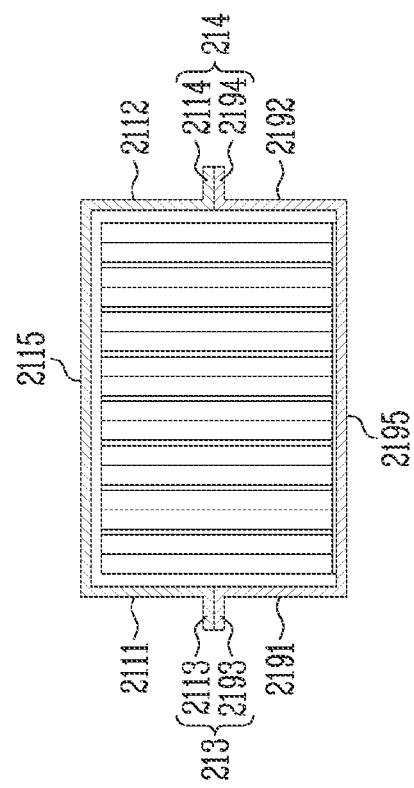
FIG. 1C shows a cross-section cut along the X-direction of another example of a battery module.

FIG. 1C shows a cross-section cut along the X-direction of another example of the battery module 200. Unlike the battery module 200 shown in FIG. 1B, the battery module 200 may include a module case 210 forming a cell accommodating space 291 for accommodating a cell assembly 100. Here, the module case 210 may include a first body 219 and a second body 211 coupled with the first body 219.

A second body 211 in FIG. 1B may be considered as simply performing a cover role. That is, the height of the second body 211 may be equal to or greater than the height of the cell assembly 100. On the other hand, the height of the first body 219 in FIG. 1C may be smaller than the height of the cell assembly 100.

In addition, referring to FIG. 1C, the battery module 200 may include a first flange portion 213 and a second flange portion 214 extending outward from both sides along the X-direction of the module case.

The first flange portion 213 and the second flange portion 214 may configure the battery pack 300 (see FIG. 2) to be supported by a comparting portion 3095 (see FIG. 2), which will be described later.

In some implementations, the first body 219 may include: a base panel 2195 supporting the cell assembly 100; and a first body first panel 2191 and a first body second panel 2192 each bent at both ends of the base panel 2195 based on the X-direction and extending in the Z-direction, which is the height direction.

In addition, the first body 219 may further include: a first body first extending portion 2193 bent at a free end of the first body first panel 2191 and extending in a direction away from the first body 219; and a first body second extending portion 2194 bent at a free end of the first body second panel 2192 and extending in a direction away from the first body 219.

Likewise, the second body 211 may include: a connecting panel 2115 disposed to face the base panel; and a second body first panel 2111 and a second body second panel 2112 each bent at both ends of the connecting panel 2115 based on the X-direction and extending toward the first body 219.

In addition, the second body 211 may further include: a second body first extending portion 2113 bent at a free end of the second body first panel 2111 and extending in a direction away from the second body 211; and a second body second extending portion 2114 bent at a free end of the second body second panel 2112 and extending in a direction away from the second body 211.

Therefore, the first flange portion 213 may formed by the first body first panel 2191 and the second body first panel 2111, and the second flange portion 214 may be formed by the first body second panel 2192 and the second body second panel 2112.

In addition, by coupling of the first body first panel 2191 and the second body first panel 2111 and coupling of the first body second panel 2192 and the second body second panel 2112, coupling force between the first body 219 and the second body 211 may be increased.

In some implementations, the first flange portion 213 and the second flange portion 214 may be disposed on only one of the first body 219 and the second body 211. For example, the first body 219 may include the base panel 2195, the first body first panel 2191, the first body second panel 2192, the first body first extending portion 2193, and the first body second extending portion 2194, while the second body 211 may include the connecting panel 2115, the second body first panel 2111, and the second body second panel 2112. In this case, the first flange portion 213 and the second flange portion 214 may be formed by the first body first extending portion 2193 and the first body second extending portion 2194. However, in this case, the first flange portion 213 and the second flange portion 214 may couple the battery module 200 with a comparting portion 3095, as will be discussed below, and an additional function of strengthening a coupling force between the first body 219 and the second body 21 may not be performed.

Figure 2:
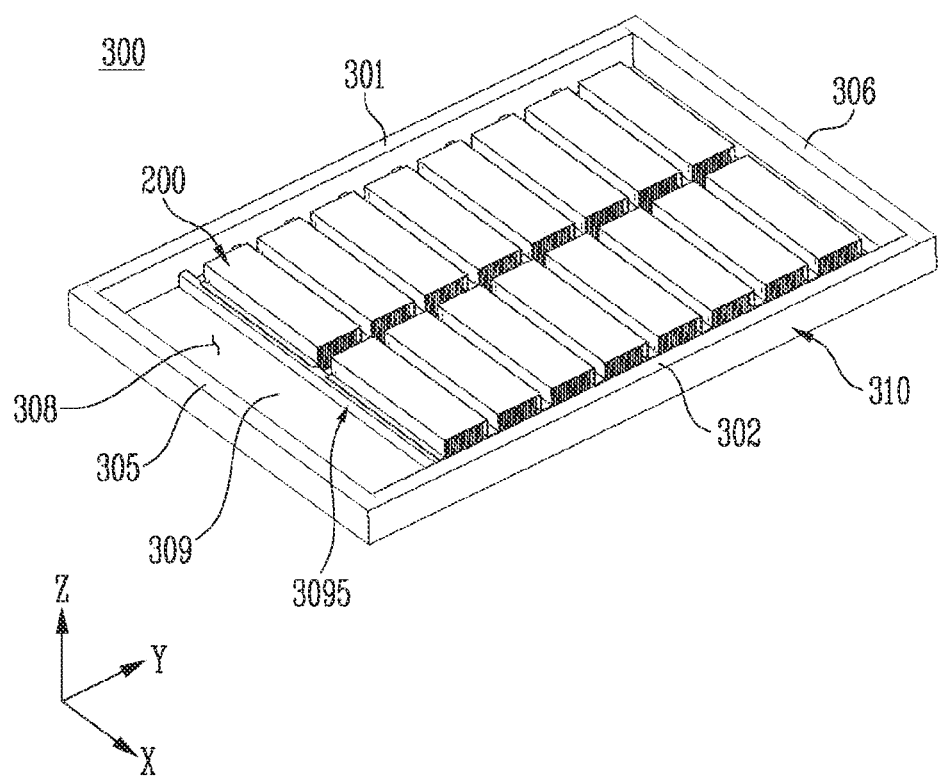
FIG. 2 shows an example of a battery pack implemented based on some embodiments of the disclosed technology.

FIG. 2 shows an example of a battery pack 300 implemented based on some embodiments of the disclosed technology. Referring to FIG. 2, the battery pack 300 may include: a module accommodating space 308 in which one or more battery modules 200 are accommodated; and an accommodating panel 309 forming a bottom surface of the module accommodating space 308.

The battery pack 300 may include an accommodating panel 309 forming a module accommodating space 308 accommodating the one or more battery modules 200.

In addition, the battery pack 300 may further include an accommodating cover (not shown) coupled with the accommodating panel 309.

Specifically, a bottom surface of the module accommodating space 308 may by formed by the accommodating panel 309. And the battery pack 300 may further include frames 301, 302, 305, 306 coupled with the accommodating panel 309 to form side surface of the module accommodating space 308.

FIG. 2 shows an example of the accommodating panel 309 that has a rectangular shape. The shape of the accommodating panel 309 may vary depending on the position at which the battery pack 300 is to be mounted. Referring to FIG. 2, the battery pack 300 may further include frames 301, 302, 305, 306 extending along one edge among the edges of the accommodating panel 309. For example, the battery pack 300 may further include a first connecting frame 301 and a second connecting frame 302 extending along the Y-direction and coupled to a part including two edges in parallel with the Y-direction among the edges of the accommodating panel 309. In addition, the battery pack 300 may further include a first extending frame 305 and a second extending frame 305 extending along the X-direction and coupled with a part including two edges among the edges of the accommodating panel 309 to be connected with the first connecting frame 301 and the second connecting frame 302, respectively.

The frames 301, 302, 305, 306 may be others members coupled with the accommodating panel 309, or may be members formed integrally with the accommodating panel 309. That is, the frames 301, 302, 305, 306 may be formed by being bent at the edgers of the accommodating panel 309.

The battery pack 300 may accommodate one or more battery modules 200. For example, all of the one or more battery modules 200 may be accommodated in one module accommodating space 308. However, in some implementations, in consideration of the connection of wires of the one or more battery modules 200, replacement of some battery modules, and safety, the one or more battery modules 200 are disposed at a predetermined spacing distance when positioned on the accommodating panel 309.

To this end, the battery pack 300 may further include a comparting portion 3095 to separate the module accommodating space 308. Therefore, the comparting portion 3095 may dispose the one or more battery modules 200 separately from each other in the module accommodating space 308.

In some implementations, when the battery pack 300 includes the first flange portion 213 and the second flange portion 214, the first flange portion 213 and the second flange portion 214 may be supported by the comparting portion 3095. That is, the first flange portion 213 and the second flange portion 214 may be located above the comparting portion 3095.

In addition, when there are two or more battery modules 200, a first flange portion 213 of any one battery module 200 of the plurality of battery modules 200 and a second flange portion 214 of the other adjacent battery module 200 may be in contact with each other on the comparting portion 3095.

When the plurality of battery modules 200 are accommodated in the battery pack 300, the comparting portion 3095 may minimize distortion or deformation of the accommodating panel 309 caused by the weight of the battery module 200.

Referring to FIG. 2, it can be seen that the comparting portion 3095 extends in the X-direction to be connected to the first connecting frame 301 and the second connecting frame 302 and comparts the module accommodating space 308 along the Y-direction.

For example, the comparting portion 3095 may extend not only in the X-direction but also in the Y-direction to compart the interior of the battery pack 300. That is, referring to FIG. 2, the comparting portion 3095 may be positioned between the plurality of battery modules 200 disposed in two rows along the Y-direction.

The comparting portion 3095 may have a bar shape. In some implementations, to minimize twisting and bending, the inside of the comparting portion 3095 may be a hollow shape. In this way, the polar moment of inertia and second moment of inertia of the comparting portion 3095 may be increased.

In some implementations, the comparing portion 3095 may be coupled with the accommodating panel 309. The accommodating panel 309 may have a single plane shape and formed to have a predetermined thickness. In some implementations, the accommodating panel 309 may include a metal material in consideration of the weight of the battery module 200 disposed on the accommodating panel 309.

However, when thermal runaway occurs in a specific battery module 200 among the plurality of battery modules 200, the accommodating panel 309 may be a major passage for transferring heat of the battery module 200 where thermal runaway has occurred to other adjacently positioned battery modules In some implementations, a cooling unit or a fire extinguishing device is used to provide cooling or fire extinguishing operation, thus blocking thermal propagation between battery modules 200. However, the disclosed technology can be implemented in some embodiments to change the thermal conductivity or thermal resistance values of the accommodating panel 309 of the battery pack 300 to provide a built-in mechanism in the construction of the accommodating panel 309 to reduce undesired thermal propagation between battery modules 200 supported by the accommodating panel 309.

Figure 3A:
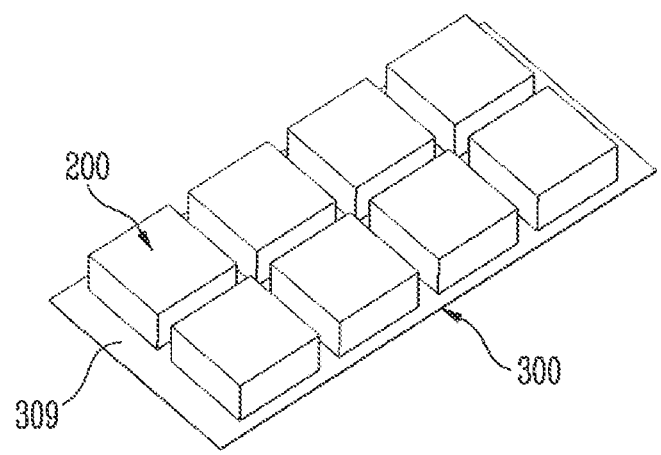
FIGS. 3A and 3B schematically show an operating principle of preventing fire between battery modules by using thermal conductivity or thermal resistance that is different depending on the position in an accommodating panel.
Figure 3B:
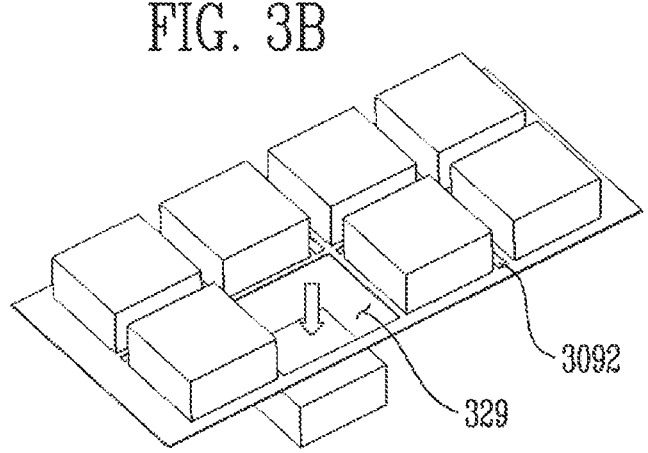

FIGS. 3A and 3B schematically show the operating principle of preventing fire between the battery modules 200 by using the accommodating panel 309 having different thermal conductivity values or thermal resistance values at different positions or segments.

FIG. 3A shows a battery pack 300 including a plurality of battery modules 200 disposed on and supported by the accommodating panel 309. The plurality of battery modules 200 may be spaced apart from one another by a predetermined spacing distance. In addition, the accommodating panel 309 may be made of a metal material to support the plurality of battery modules 200.

When it is assumed that thermal runaway occurs in one or more battery cells 110 accommodated in a specific battery module 200 among the plurality of battery modules 200, the temperature of the battery module 200 including the battery cell 110 where thermal runaway has occurred may also increase. In severe cases, not only an increase of temperature but also smoke and fire may occur due to the thermal runaway.

For different battery modules 200, the temperature increase occurring in any one battery module may be transferred to an adjacent battery module in the form of transfer of heat. The form of heat transfer may occur via one or more of thermal conduction, thermal convection, and/or thermal radiation. In implementations where the material of the accommodating panel 309 is a metal, the main passage and form of heat transfer between battery modules 200 may be thermal conduction through the accommodating panel 309 because a metal is usually a thermal conducting material due to the relatively high thermal conductivity of the metal.

Therefore, changing the thermal resistance value or thermal conductivity of the major passage of heat transfer in the accommodating panel 309 at different locations or segments can interrupt the thermal conduction to reduce or minimize the amount of heat being conducted via the accommodating panel 309. As a result, the transfer of heat from a battery module 200 where thermal runaway has occurred to other adjacent battery modules may be reduced, minimized, or prevented.

When heat from the battery module 200 where thermal runaway has occurred is not transferred to other battery modules, heat may continue to accumulate in an area where the battery module 200 (the battery module where thermal runaway has occurred) is positioned. Accordingly, the temperature of the battery module 200 where thermal runaway has occurred and an area of the accommodating panel 309 supporting the battery module 200 where thermal runaway has occurred may increase. Referring to FIG. 3B, considering that the module case 210 and the accommodating panel 309 include a metal, when the increased temperature becomes higher than a certain temperature, a part of the accommodating panel 309 may be deformed or even melted, the battery module 200 in which thermal runaway has occurred may fall in the direction of the gravity due to its own weight and be dropped from the battery pack 300. Alternatively, a lower surface of the battery module 200 where thermal runaway has occurred may be deformed or melted, and a cell assembly 100 where thermal runaway has occurred, which is positioned inside the module case 210, may be separated and fall apart. FIG. 3B uses an arrow to indicate that a part of the accommodating panel 309 is melted away at a particular location where an accommodating panel through-hole 329 is formed, and the battery module 200 where thermal runaway has occurred falls down due to its own weight through the accommodating panel through-hole 329.

Figure 4:
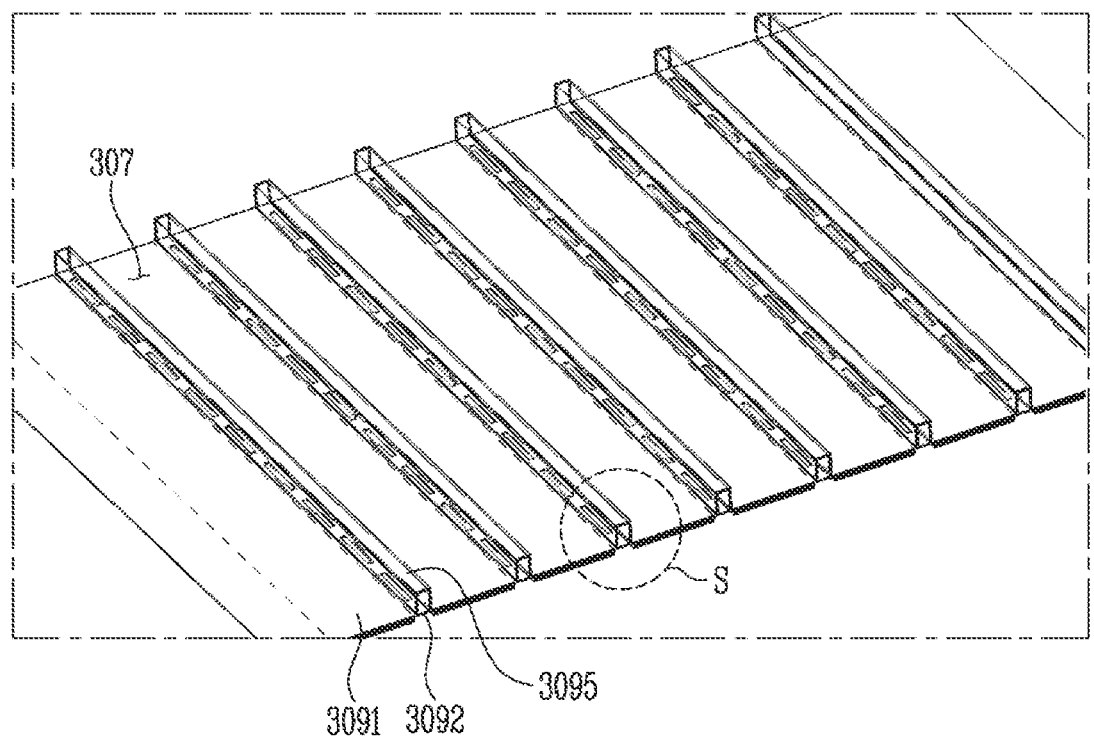
FIG. 4 shows an example of an accommodating panel.

FIG. 4 shows an example of the accommodating panel 309 that implements different portions or segments with different thermal conductivity values or thermal resistance values to cause spatial disruption of thermal conduction based on one implementation of the disclosed technology.

In order for the accommodating panel 309 to have different thermal conductivity values or thermal resistance values depending on the position, the accommodating panel 309 may include: a first bottom surface 3091 where the battery module 200 is positioned; and a second bottom surface 3092 connected to at least a part of the first bottom surface 3091 and including a thermal resistance portion (3092a, see FIG. 5) which blocks conduction of heat generated from the battery module 200 through the first bottom surface 3091 or which has a different thermal conductivity from the first bottom surface 3091.

In some implementations, the thermal resistance portion 3092a may be disposed at the bottom of the comparting portion 3095 along an extending direction of the comparting portion 3095. This is because the first bottom surface 3091 may support the battery module 200, while the second bottom surface 3092 may be positioned between the battery modules 200, and the comparting portion 3095 may also be positioned along the bottom surface 3092.

Therefore, at least a part of the thermal resistance portion 3092a may be shielded by the comparting portion 3095 when the thermal resistance portion 3092a is viewed from above the accommodating panel 309. That is, only after separating the comparting portion 3095 from the accommodating panel 309, the heat resistance portion 3092a may be exposed to the outside when the thermal resistance portion 3092a is viewed from above the accommodating panel 309.

In some implementations, the comparting portion 3095 may be an angulated U-shaped frame open toward the second bottom surface. Therefore, when the comparting portion 3095 is coupled with the accommodating panel 309, the interior of the comparting portion and the accommodating panel 309 may form an empty space, increasing the polar moment of inertia and second moment of inertia of the comparting portion 3095. In other words, this is because a hollow member is more resistant to twisting and deformation than a solid member.

Figure 5:
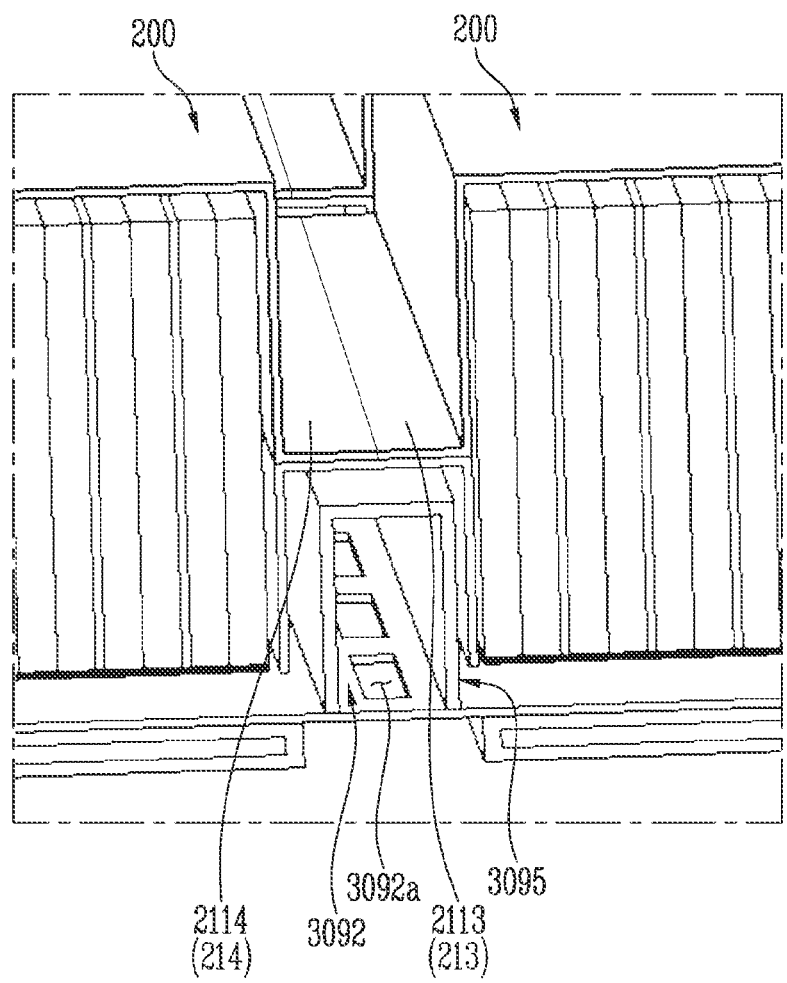
FIG. 5 shows an enlarged example of a comparting portion and a second bottom surface.
Figure 6A:
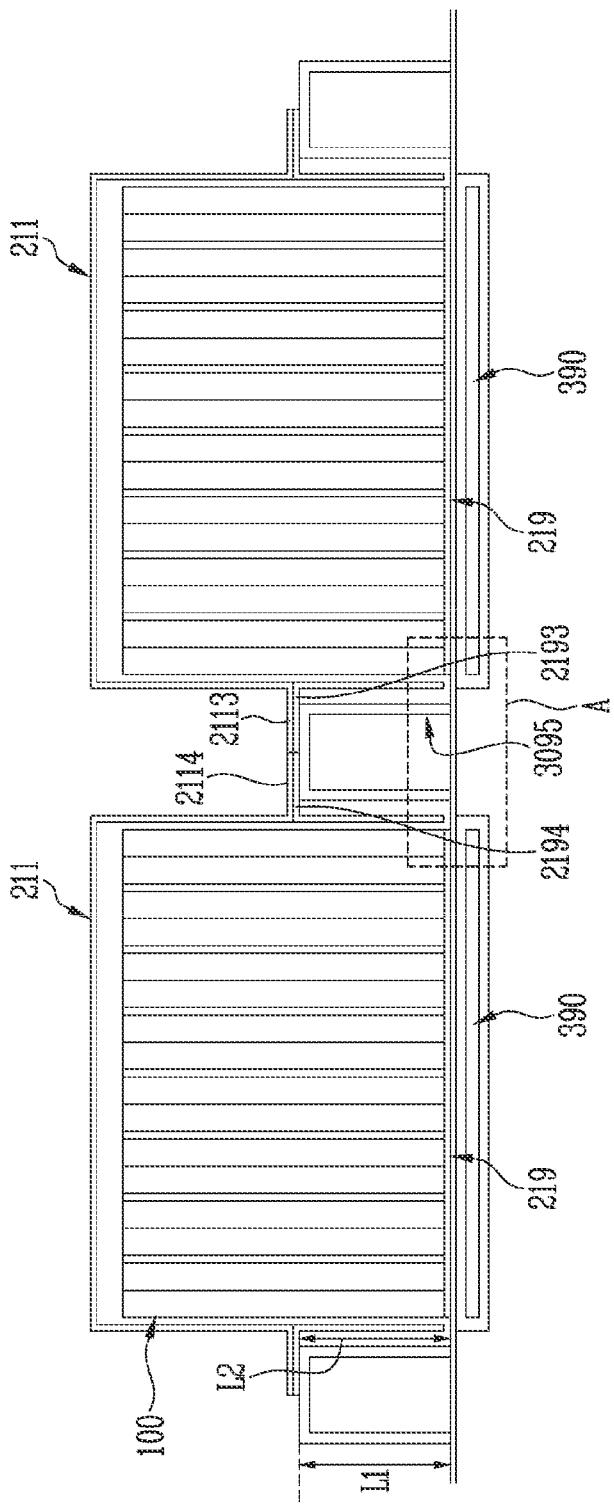
FIG. 6A shows a cross-section of a battery module, a comparting portion, a first bottom surface, and a second bottom surface.
Figure 6C:
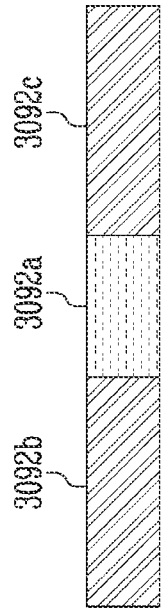
FIG. 6C shows another example of the second bottom surface.
Figure 6B:
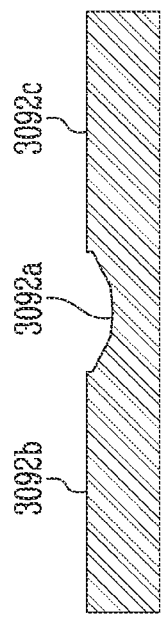
FIG. 6B shows an example of the second bottom surface.

FIG. 5 shows an enlarged example of the comparting portion 3095 and the second bottom surface 3092. FIG. 6A shows a cross-section of the battery module 200, the comparting portion 3095, the first bottom surface 3091, and the second bottom surface 3092. FIG. 6B shows an example of the second bottom surface 3092. FIG. 6C shows another example of the second bottom surface 3092.

Referring to FIGS. 5 and 6A, two or more battery modules 200 may be provided and may be adjacent to each other but separated by the comparting portion 3095.

As shown in FIG. 1B, when the battery module 200 is provided with a first flange portion 213 and a second flange portion 214 extending in a direction away from the module case 210, as shown in FIG. 5, a second flange portion 214 of any one battery module 200 and a first flange portion 213 of the other adjacent battery module 200 may be positioned on the comparting portion 3095 and come into contact with each other.

In some implementations, the second flange portion 214 of any one battery module 200 and the first flange portion 213 of the other adjacent battery module 200 may be positioned apart from each other without contacting each other.

The second flange portion 214 of any one battery module 200 may be formed by coupling a first body second extension portion 2194 and a second body second extension portion 2114 with each other when the first body 219 and the second body 211 are coupled, and the first flange portion 213 of the other adjacent battery module 200 may be formed by coupling a first body first extension portion 2193 and a second body first extension portion 2113 when the first body 219 and the second body 211 are coupled.

Referring to FIGS. 4 and 5, a part of the accommodating panel 309 where a base panel 2195 of the battery module is in contact with the accommodating panel may form the first bottom surface 3091. The second bottom surface 3092 may be positioned between the base panels 2195 (see FIG. 1C).

If a battery module 200 does not have the first flange portion 213 and the second flange portion 214, the first bottom surface 3091 is an area where the battery module 200 is positioned, and the second bottom surface 3092 may be positioned in an area positioned between the battery modules 200 to connect the first bottom surface 3091.

Referring to FIG. 6A, the height L1 from the accommodating panel 309 to the upper surface of the comparting portion 3095 may be the same as the height L2 from the accommodating panel 309 to the first flange portion 213 and a lower surface of the second flange portion 214. Therefore, the base panel 2195 may be in contact with the first bottom surface 3091 to be supported by the first bottom surface.

If the battery module 200 is only one battery module, the battery pack 300 may not include the comparting portion 3095. In this case, the second bottom surface 3092 may be positioned between the first bottom surface 3091 and an edge of the accommodating panel 309.

In some implementations, referring to FIG. 6A, the battery pack 300 may further include a cooling unit 390 positioned below the battery module 200 to cool the battery module 200. For independent cooling of each battery module 200, when there are two or more battery modules 200, two or more cooling units 390 may also be provided and positioned below each of the plurality of battery modules 200. In addition, the plurality of cooling units 390 may each operate independently. When thermal runaway occurs in any one of the plurality of battery modules 200, this is to separate only the battery module 200 where thermal runaway has occurred from the battery pack 300.

In a case where the plurality of cooling units 390 is independently provided, inlets and outlets of the plurality of cooling units 390 are connected in series rather than in parallel. That is, even when the cooling unit fails to operate due to thermal runaway in any one battery module 200, the other cooling units may normally supply and circulate a coolant.

FIG. 6A shows an example in which the cooling units 390 are positioned with the first bottom surface 3091 therebetween. The battery module 200 may be positioned above the first bottom surface 3091, and the cooling unit 390 may be positioned below the first bottom surface 3091. Since the material of the first bottom surface 3091 is a metal, for example, an aluminum metal material, even when the cooling unit 390 is spaced apart from the battery module 200, smooth cooling may be achieved through the first bottom surface 3091.

In some implementations, in order for the thermal resistance value or thermal conductivity of the second bottom surface 3092 to be different from the first bottom surface 3091, the area through which heat is conducted is reduced or the thickness through which heat is conducted is reduced. In some implementations, the material of the second bottom surface 3092 is different from the material of the first bottom surface 3091.

To separate only the battery module 200 where thermal runaway has occurred, the second bottom surface 3092 may include a thermal resistance portion 3092a having a different thermal conductivity or thermal resistance value.

FIG. 5 shows an example in which the thermal resistance portion 3092a is in the form of a hole formed through the second bottom surface 3092. Since heat may not be conducted through the hole-shaped thermal resistance portion 3092a, the thermal conductivity at the first bottom surface 3091 and the thermal conductivity at the second bottom surface 3092 may be different due to the area difference, and the second bottom surface 3092 will have a greater thermal resistance value.

Therefore, heat of the battery module 200 where thermal runaway has occurred may not be dissipated to other adjacent battery modules 200 through the second bottom surface 3092 but may continue to accumulate. In other words, only the first bottom surface 3091 supporting the battery module 200 where thermal runaway has occurred will exhibit a faster temperature increase than other areas of the accommodating panel 309.

Referring to FIG. 6B, the thermal resistance portion 3092a may be provided in the form of a groove. The second bottom surface 3092 may include a first connecting portion 3092b and a second connecting portion 3092c connecting the heat resistance portion 3092a and one side of the heat resistance portion 3092a to the first bottom surface 3091.

The thickness of at least a part of the thermal resistance portion 3092a may be smaller than the thickness of the first bottom surface 3091. Since the thickness is small, the thermal conductivity of the thermal resistance portion 3092a may be smaller than that of the first bottom surface 3091, and the thermal resistance value may be greater.

In addition, referring to FIG. 6C, the thermal resistance portion 3092a may include a material different from that of the first bottom surface. In addition, the material of the thermal resistance portion 3092a may be different from the material of the first connecting portion 3092b and the second connecting portion 3092c. Therefore, even when the thickness of the first bottom surface 3091 and the second bottom surface 3092 are the same, the thermal conductivity of the thermal resistance portion 3092a may be less than the thermal conductivity of the first bottom surface 3091.

Referring to FIG. 5, a hole shape of the thermal resistance portion 3092a may extend in parallel with one side surface of the battery module 200. In addition, there may be a plurality of holes arranged continually rather than in the form of one large hole. Since the thermal resistance portion 3092a is formed to prevent the heat of a battery module 200 where thermal runaway has occurred from being conducted to another adjacent battery module 200 through the second bottom surface 3092, the thermal resistance portion 3092a may have any shape as long as the thermal conductivity or thermal resistance value is different.

Likewise, a groove-shaped thermal resistance portion 3092a illustrated in FIGS. 6B and 6C or a thermal resistance portion 3092a made of another material may also be provided as a single element or item extending in parallel with one side surface of the battery module 200, or may also be provided as a plurality of elements or items.

In one example, the thermal resistance portion 3092a may have a single groove extending in parallel with one side surface of the battery module 200. In another example, the thermal resistance portion 3092a may have a plurality of grooves extending in parallel with one side surface of the battery module 200.

In some implementations, even if the thermal resistance portion 3092a is made of a different material, the portions including different materials are not integrated into one part, but it may discontinuously extend in parallel with one side surface of the battery module 200.

FIG. 7A shows a cross-section of the battery module 200 and a compartment 3095 adjacent to the battery module 200. FIG. 7B shows an example of the battery module 200 being separated.

Assuming a case where thermal runaway occurs in a specific battery cell of the cell assembly 100, thermal runaway of the battery cell 110 will propagate to adjacent battery cells. Accordingly, heat of the battery module 200 accommodating the cell assembly 100 will transfer or propagate to other adjacent battery modules 200. The main passage and form of this heat transfer may be thermal conduction through specific areas (CH1, CH2) of an accommodating panel.

In the disclosed technology, in order to block or delay the propagation of heat, the battery module 200 which exhibits a rapid temperature increase due to thermal runaway is separated from the battery pack 300.

To this end, as shown in FIG. 3B, the battery module 200 is separated from the accommodating panel 309. In addition, FIG. 7B shows another example in which the cell assembly 100 is separated from the module case 210 and the accommodating panel 309.

The example in FIG. 3B is an example for which a case where the battery module 200 does not have a first flange portion 213 and a second flange portion 214 is assumed. On the other hand, FIG. 7B illustrates an example where a first flange portion 213 and a second flange portion 214 are supported by the comparting portion 3095.

When transfer of heat through the accommodating panel 309 begins to be blocked or mitigated by the thermal resistance portion 3092a, the temperature of a first bottom surface 3091 supporting a battery module 200 where thermal runaway has occurred will increase faster than that of other positions of the accommodating panel 309.

Therefore, when the temperature of a first bottom surface 3091 supporting a battery module 200 where thermal runaway has occurred reaches a preset deformation temperature higher than room temperature, the first bottom surface 3091 may be deformed or melted earlier than other positions of the accommodating panel 309.

When the temperature reaches the deformation temperature or higher, the tensile strength of the first bottom surface 3091 may be lower than the tensile strength of the first bottom surface 3091 at room temperature.

In addition, above the deformation temperature, as at least a part of the first bottom surface 3091 is deformed, the shape of the accommodating panel 309 may be deformed due to the weight of the battery module 200. Accordingly, as the accommodating panel 309 is deformed and torn or the accommodating panel 309 is melted down, the battery module 200 may be separated from the accommodating panel 309.

Considering that the accommodating panel 309 is made of an aluminum material for structural rigidity and heat generation, the deformation temperature may be 660° C.

In some implementations, the temperature of the module case 210 including a cell assembly 100 where thermal runaway has occurred may also be similar to that of the accommodating panel 309. That is, when the temperature of the base panel 2195, which is a lower surface of the module case 210, reaches a preset allowable temperature or higher, the tensile strength of the base panel 2195 may be lower than the tensile strength of the base panel 2195 at room temperature.

Ultimately, as the base panel 2195 is deformed or melted, the cell assembly 100 may be separated from the battery module 200 and the accommodating panel 309.

That is, referring to FIG. 3B, the entire battery module 200 may be separated from the accommodating panel 309. In addition, referring to FIG. 7B, the cell assembly 100 of the battery module 200 may be separated from the module case 210 and the accommodating panel 309 in the direction of gravity (the g-direction).

Considering that the main material of the base panel 2195 is an aluminum material, the allowable temperature may be 660° C.

Figure 8B:
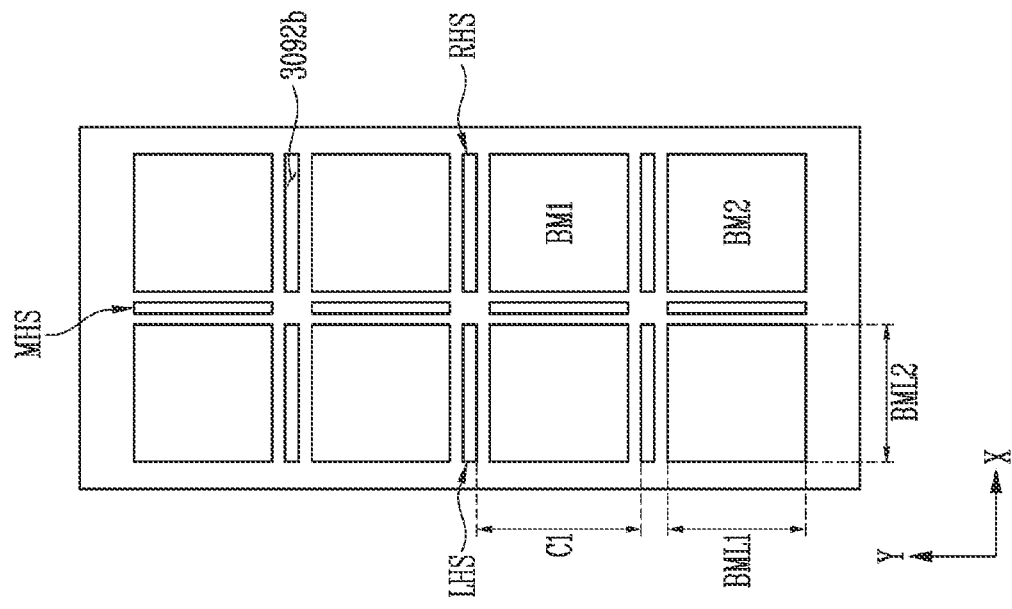
FIG. 8B shows another example of an accommodating panel based on some embodiments of the disclosed technology.
Figure 8A:
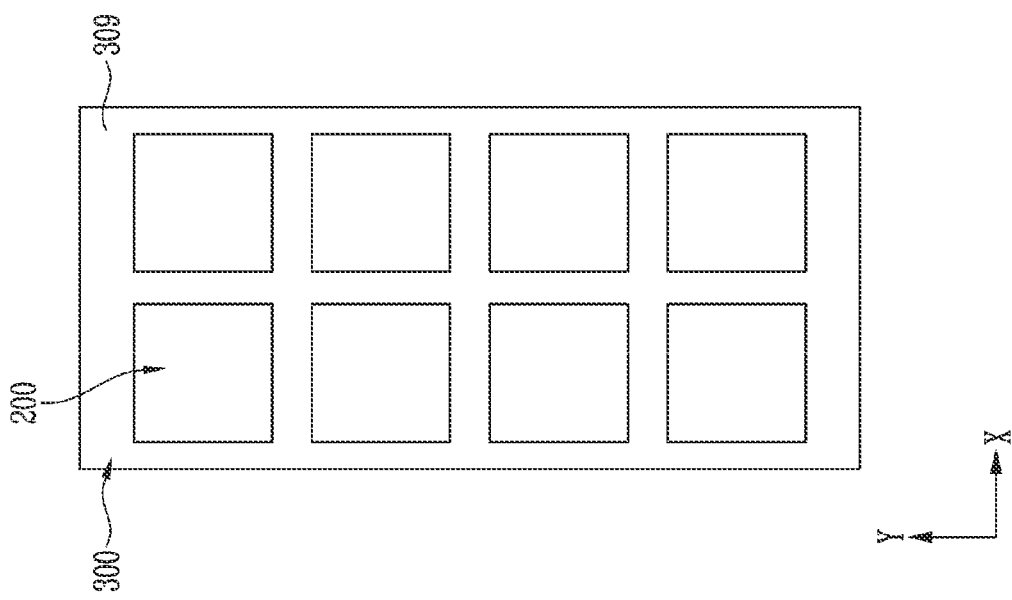
FIG. 8A shows a typical example of an accommodating panel.

FIG. 8A shows a typical example of an accommodating panel. FIG. 8B shows another example of an accommodating panel 309 based on some embodiments of the disclosed technology. FIGS. 8 and 9 show an example in which the thermal resistance portion 3092a extends in the form of a hole along one side of the battery module 200. However, this is only an example, and the thermal resistance portion 3092a may be provided in the shape of a groove or made of a material with a different thermal conductivity.

In addition, referring to FIGS. 8 and 9, the thermal resistance portion 3092a may be provided in the form of a single hole in parallel with one side of the battery module 200, but the thermal resistance portion 3092a may be continuously or discontinuously provided in the form of a plurality of holes on one side of the battery module 200.

Referring to FIG. 8A, a typical battery pack may include an accommodating panel 309 accommodating the one or more battery modules 200. The accommodating panel 309 may form a lower surface of the battery pack 300.

In FIGS. 8 and 9, for the sake of convenience, an accommodating panel 309 is expressed in a rectangular shape, and among edges of the accommodating panel 309, a long edge is illustrated to extend in the Y-direction, and a short edge is illustrated to extend in the X-direction. In addition, the battery module 200 is illustrated with an example in which eight battery modules are disposed in four rows of two on the accommodating panel 309, but this is only one example, and the disposition method and the number of accommodated battery modules may vary.

Referring to FIG. 8B, the accommodating panel 309 has a first bottom surface 3091 supporting the battery module 200 and a second bottom surface 3092 connecting the first bottom surfaces therebetween. The second bottom surface 3092 may include a thermal resistance portion 3092a having a different thermal conductivity or a different thermal resistance value from that of the first bottom surface 3091.

Referring to FIG. 8B, an example is illustrated in which the comparting portion 3095 is omitted and thus the thermal resistance portion 3092a is exposed to the outside.

The first bottom surface 3091 may support a lower surface of the battery module 200, that is, the base panel 2195. When a plurality of base panels 2195 are provided, the base panels 2195 or the battery modules 200 may be disposed separately from each other by the comparting portion 3095.

In some implementations, depending on whether a battery module 200 includes a first flange portion 213 and a second flange portion 214 extending from both sides of a module case 210 in a direction away from the module case 210, the comparting portion 3095 may not completely separate the battery module 200, but rather it may separate only a part of the module case 210 except for the first flange portion 213 and the second flange portion 214, for example, only a base panel or a connecting panel.

For the sake of convenience, FIG. 8B omits the first flange portion 213, the second flange portion 214, and the comparting portion 3095 supporting the two flange portions 213, 214.

Referring to FIG. 8B, the thermal resistance portion 3092a may be positioned between the plurality of battery modules 200. The accommodating panel 309 may further include: a plurality of first bottom surfaces 3091 supporting the plurality of battery modules 200; and a second bottom surface 3092 disposed between the plurality of first bottom surfaces 3091 to connect the plurality of first bottom surfaces 3091. In addition, the second bottom surface 3092 may include a thermal resistance portion 3092a provided in the form of a hole (or groove, or a material having different thermal conductivity).

When any one battery module BM1 and the other battery module BM2 among the plurality of battery modules 200 are explained as an example, the thermal resistance portion 3092a may be positioned between the two battery modules BM1, BM2. In addition, the thermal resistance portion 3092a may also be disposed between other battery modules that are adjacent to the two battery modules BM1, BM2 in the X-direction.

When the accommodating panel 309 is viewed from above, a heat resistance portion 3092a disposed in an area positioned near to a right edge of two edges of the accommodating panel 309 may be referred to as a right heat-resistant side RHS.

Likewise, when the accommodating panel 309 is viewed from above, a heat resistance portion 3092a disposed in an area positioned near to a left edge of two edges of the accommodating panel 309 may be referred to as a left heat-resistant side LHS.

Referring to FIG. 8B, when the plurality of battery modules 200 are disposed in two rows, the accommodating panel 309 may include a heat resistance portion 3092a between a battery module 200 of any one row and a battery module 200 of the other row. The heat resistance portion 3092a may be referred to as a middle heat-resistant side MHS.

The thermal resistance portion 3092a may be positioned only between the battery modules 200 and does not need to be provided between side surfaces of the accommodating panel, because the temperature of a corresponding first bottom surface 3091 only needs to be increased by using the thermal resistance portion 3092a for deformation or melting, rather than the thermal resistance value or thermal conductivity of only a part changes to prevent heat from completely escaping.

For example, in an area where the other one battery module BM2 is positioned, the accommodating panel 309 may include the thermal resistance portion 3092a only on two of the four side surfaces of the battery module. However, when thermal runaway occurs in the other one battery module BM2, the amount of heat per unit time escaping through the first bottom surface 3091 is reduced by the thermal resistance portion 3092a, and thus the temperature of the first bottom surface 3091 may rapidly increase to the deformation temperature or higher.

Referring to FIG. 8B, among the thermal resistance portions 3092a, the spacing C1 between thermal resistance portions 3092a provided in parallel with the −X direction may be a length along the −Y direction of the battery module 200 or longer. Therefore, the area of the first bottom surface 3091 may be equal to or larger than the area of the base panel 2195. Through this, the first bottom surface 3091 may stably support the battery module 200.

In some implementations, the spacing C1 between the thermal resistance portions 3092a along the Y-direction may be equal to less than an extension length C2 of the thermal resistance portions 3092a along the X-direction (see FIG. 9B). However, it may vary depending on the shape of the battery module 200.

FIG. 9A shows another example of the accommodating panel 309. The accommodating panel 309 may include a thermal resistance portion 3092a that is disposed so that three of the four side surfaces of the battery module 200 may be surrounded by the thermal resistance portion 3092a.

In some implementations, unlike the accommodating panel 309 of FIG. 8B, the accommodating panel 309 of FIG. 9A may also include the thermal resistance portion 3092a between the first accommodating edge 309a and the second accommodating edge 309b, provided in parallel with the X-direction among edges of the accommodating panel 309, and the battery module 200, allowing the temperature of the first bottom surface 3091 supporting a battery module 200 where thermal runaway has occurred to reach the deformation temperature more quickly.

When the first accommodating edge 309a is defined as the rear of the battery pack 300 and the second accommodating edge 309b is defined as the front of the battery pack 300, the battery pack 300 may further include a rear left heat-resistant side RLHS and a rear right heat-resistant side RRHS and a front left heat-resistant side FLHS and a front right heat-resistant side FRHS between a first accommodating edge 309a positioned in the rear among edges of the accommodating panel 309 and the battery module 200 and between a second accommodating edge 309b positioned in the front among edges of the accommodating panel 309 and the battery module 200, respectively.

When viewed from the front or from the top of the accommodating panel 309, the rear heat resistance portions RLHS, RRHS may be divided into a rear left heat-resistance portion RLHS and a rear right heat-resistance portion RRHS according to the left and right sides.

Likewise, when viewed from the front or from the top of the accommodating panel 309, the front heat-resistance portions FLHS, FRHS may be divided into a front left heat-resistance portion FLHS and a front right heat-resistance portion FRHS according to the left and right sides.

FIG. 9B shows still another example of the accommodating panel 309. When the accommodating panel 309 has a rectangular shape, the accommodating panel 309 will include four edges: a first accommodating edge 309a, a second accommodating edge 309b, a third accommodating edge 309c, and a fourth accommodating edge 309d. The second bottom surface 3092 may also be formed between the four edges 309a, 309b, 309c, 309d and the first bottom surface 3091.

In addition, the accommodating panel 309 may further include a heat resistance portion 3092a between the four edges 309a, 309b, 309c, 309d and the first bottom surface 3091. That is, the accommodating panel 309 may include a thermal resistance portion 3092a that is disposed so that all four side surfaces of the battery module 200 are surrounded by the thermal resistance portion 3092a.

In other words, when two or more battery modules 200 are provided, the thermal resistance portion 3092a may also be positioned between each of the base panels 2195 and edges of the accommodating panel 309, allowing the temperature of the first bottom surface 3091 supporting the battery module 200 where thermal runaway has occurred to reach the deformation temperature more quickly.

For example, referring to FIG. 9B, the accommodating panel 309 may include a third accommodating edge 309c and a fourth accommodating edge 309c arranged in parallel along the Y-direction among the four edges 309a, 309b, 309c, 309d.

When the third accommodating edge 309c is at the left of the battery pack 300 and the fourth accommodating edge 309d is at the right of the battery pack 300, the battery pack 300 may further include a left laterally heat-resistant side LLHS and a right laterally heat-resistant side RLHS between a third accommodating edge 309c positioned at the left of the battery pack 300 among edges of the accommodating panel 309 and the battery module 200 and between a fourth accommodating edge 309d positioned at the right of the battery pack 300 among edges of the accommodating panel 309 and the battery module 200, respectively.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. A battery pack comprising:
   one or more battery modules, each battery module including one or more battery cells, and a module case structured to accommodate the one or more battery cells and to include a base panel structured to form a lower surface of the module case that supports the one or more battery cells;
   an accommodating panel structured to form a bottom surface of a module accommodating space for accommodating the one or more battery modules; and
   a comparting portion coupled to the accommodating panel to separate each of the one or more battery modules,
   wherein the accommodating panel includes:
   a first bottom surface positioned to face each of the base panels of the one or more battery modules; and
   a second bottom surface connected to at least a part of the first bottom surface, and including a heat resistance portion extending along an edge of the first bottom surface and configured to reduce conduction of heat generated by any one of the battery modules to another adjacent battery module through the first bottom surface,
   wherein the heat resistance portion includes one or more grooves extending in parallel with a side surface of the one or more battery modules,
   wherein the comparting portion includes an angulated U-shaped frame open toward the second bottom surface.

2. The battery pack according to claim 1, wherein a thickness of at least a part of the heat resistance portion is smaller than a thickness of the first bottom surface.

3. The battery pack according to claim 1, wherein a thermal conductivity of the heat resistance portion is smaller than a thermal conductivity of the first bottom surface.

4. The battery pack according to claim 1, wherein the heat resistance portion extends in a direction in parallel with any one of edges of the base panel.

5. The battery pack according to claim 1, wherein, in response to a temperature of the base panel that reaches a temperature that is equal to or higher than a preset allowable temperature higher than room temperature, a tensile strength of the base panel is determined to be lower than a tensile strength of the base panel at the room temperature.

6. The battery pack according to claim 1, wherein, in response to a temperature of the first bottom surface that reaches a temperature that is equal to or higher than a preset deformation temperature higher than room temperature, a tensile strength of the first bottom surface is determined to be lower than a tensile strength of the first bottom surface at the room temperature.

7. The battery pack according to claim 6, wherein at the preset deformation temperature or a temperature higher than the preset deformation temperature, a shape of the accommodating panel is deformed by a weight of the one or more battery modules.

8. The battery pack according to claim 1, wherein the heat resistance portion is disposed below the comparting portion along an extending direction of the comparting portion.

9. The battery pack according to claim 8, wherein at least a part of the heat resistance portion is shielded by the comparting portion when the heat resistance portion is viewed from above the accommodating panel.

10. The battery pack according to claim 1, wherein the module case includes:
    a first flange portion and a second flange portion extending in a direction away from both sides of the module case,
    wherein the one or more battery modules are accommodated in the module accommodating space, and the first flange portion and the second flange portion are positioned above the comparting portion.

11. The battery pack according to claim 1, wherein the module case includes:
    a first body including a first body first panel and a first body second panel extending in a direction away from the accommodating panel, wherein the first body first panel and the first body second panel extend from the base panel and from a pair of edges facing each other among edges of the base panel, respectively; and
    a second body including a second body first panel and a second body second panel extending toward the first body, wherein the second body first panel and the second body second panel extend from a connecting panel facing the base panel and from a pair of edges provided at positions corresponding to the first body first panel and the first body second panel among edges of the connecting panel, respectively, wherein the second body is coupled to the first body.

12. The battery pack according to claim 11, wherein the module case further includes:
    a first body first extension portion and a first body second extension portion bent from the first body first panel and the first body second panel, respectively, and extending in a direction away from the first body;
    a second body first extension portion and a second body second extension portion bent from the second body first panel and the second body second panel, respectively, and extending in a direction away from the first body;
    a first flange portion includes the first body first extension portion and the second body first extension portion that face each other and are coupled to each other; and a second flange portion includes the first body second extension portion and the second body second extension portion that face each other and are coupled to each other.

13. The battery pack according to claim 12, wherein, the one or more battery modules are accommodated in the module accommodating space, and the first flange portion and the second flange portion are positioned above the comparting portion.

14. The battery pack according to claim 13, wherein, a temperature of the base panel reaches a preset allowable temperature higher than room temperature, and a tensile strength of the base panel is lower than the tensile strength of the base panel at room temperature.

15. The battery pack according to claim 13, wherein, in response to a temperature of the first bottom surface that reaches a preset deformation temperature higher than room temperature, a tensile strength of the first bottom surface is lower than a tensile strength of the first bottom surface at room temperature.

16. The battery pack according to claim 1, wherein each base panel of the one or more battery modules is positioned separately from each other on the accommodating panel, and at least a part of the second bottom surface is positioned between adjacent base panels of the one or more battery modules.

17. The battery pack according to claim 16, further including a plurality of cooling units, each cooling unit positioned below the one or more battery modules.

18. The battery pack according to claim 16, wherein the second bottom surface is further positioned between an edge of each base panel and an edge of the accommodating panel.

* * * * *